(12) United States Patent
Fujimoto

(10) Patent No.: US 8,140,626 B2
(45) Date of Patent: Mar. 20, 2012

(54) APPARATUS OF PLAYING CASINO GAME

(75) Inventor: Yoshinari Fujimoto, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 402 days.

(21) Appl. No.: 12/407,245

(22) Filed: Mar. 19, 2009

(65) Prior Publication Data

US 2010/0069157 A1 Mar. 18, 2010

(30) Foreign Application Priority Data

Sep. 12, 2008 (KR) .................. 10-2008-0090090

(51) Int. Cl.
G06F 15/16 (2006.01)
A63F 9/24 (2006.01)
A63F 13/00 (2006.01)
G06Q 30/00 (2012.01)

(52) U.S. Cl. ........ 709/205; 709/203; 709/207; 709/219; 705/14.12; 705/14.56; 705/14.66; 463/25; 463/42

(58) Field of Classification Search .................... 709/205
See application file for complete search history.

(56) References Cited

U.S. PATENT DOCUMENTS

| 6,377,669 | B1 * | 4/2002 | Walker et al. | 379/144.05 |
| 7,424,617 | B2 * | 9/2008 | Boyd et al. | 713/176 |
| 7,660,737 | B1 * | 2/2010 | Lim et al. | 705/14.49 |
| 7,870,026 | B2 * | 1/2011 | Krishnan et al. | 705/14.49 |
| 7,878,901 | B2 * | 2/2011 | Walker et al. | 463/25 |
| 2001/0034643 | A1 * | 10/2001 | Acres | 705/14 |
| 2002/0120501 | A1 * | 8/2002 | Bell et al. | 705/14 |
| 2005/0171839 | A1 * | 8/2005 | Corriere | 705/14 |
| 2006/0270478 | A1 * | 11/2006 | Barhydt et al. | 463/41 |
| 2006/0277103 | A1 * | 12/2006 | Fujita et al. | 705/14 |
| 2007/0293307 | A1 * | 12/2007 | DeRosa-Grund et al. | 463/25 |
| 2008/0026827 | A1 * | 1/2008 | Skotarczak et al. | 463/25 |
| 2008/0102957 | A1 * | 5/2008 | Burman et al. | 463/42 |
| 2008/0195494 | A1 * | 8/2008 | Postrel | 705/14 |
| 2008/0306826 | A1 * | 12/2008 | Kramer et al. | 705/14 |
| 2009/0191962 | A1 * | 7/2009 | Hardy et al. | 463/29 |
| 2009/0259534 | A1 * | 10/2009 | Utter et al. | 705/14 |
| 2009/0276303 | A1 * | 11/2009 | Singhal | 705/14.11 |
| 2010/0076847 | A1 * | 3/2010 | Heller | 705/14.53 |
| 2010/0203963 | A1 * | 8/2010 | Allen et al. | 463/30 |
| 2010/0227672 | A1 * | 9/2010 | Amour | 463/25 |
| 2010/0228606 | A1 * | 9/2010 | Walker et al. | 705/10 |
| 2010/0262465 | A1 * | 10/2010 | Vasilakos | 705/10 |
| 2010/0279764 | A1 * | 11/2010 | Allen et al. | 463/25 |
| 2011/0014972 | A1 * | 1/2011 | Herrmann et al. | 463/25 |

(Continued)

FOREIGN PATENT DOCUMENTS

JP 08317372 A * 11/1996

(Continued)

Primary Examiner — Lynn Feild
Assistant Examiner — Melvin H Pollack
(74) Attorney, Agent, or Firm — Duane Morris LLP

(57) ABSTRACT

An apparatus of playing casino game has presentation means for presenting an affiliate advertisement, control means for transmitting personal information of users to a sever of the affiliate advertisement and obtaining a point which is compensation, execution means for getting a user to execute a casino game with the point as stakes, means for searching and extracting an advertisement to which a user can respond out of the affiliate advertisements when the point becomes a predetermined value or lower during execution of the game, and means for instructing to collectively transmit personal information of a user regarding all extracted affiliate advertisements.

2 Claims, 8 Drawing Sheets

U.S. PATENT DOCUMENTS

2011/0078008 A1* 3/2011 Postrel .................. 705/14.23
2011/0092273 A1* 4/2011 Cerbini ..................... 463/25
2011/0111837 A1* 5/2011 Gagner et al. ............. 463/25
2011/0118004 A1* 5/2011 Kelly et al. ............... 463/20
2011/0124392 A1* 5/2011 Kroeckel et al. ........... 463/20

FOREIGN PATENT DOCUMENTS

JP 2001-117847 4/2001

* cited by examiner

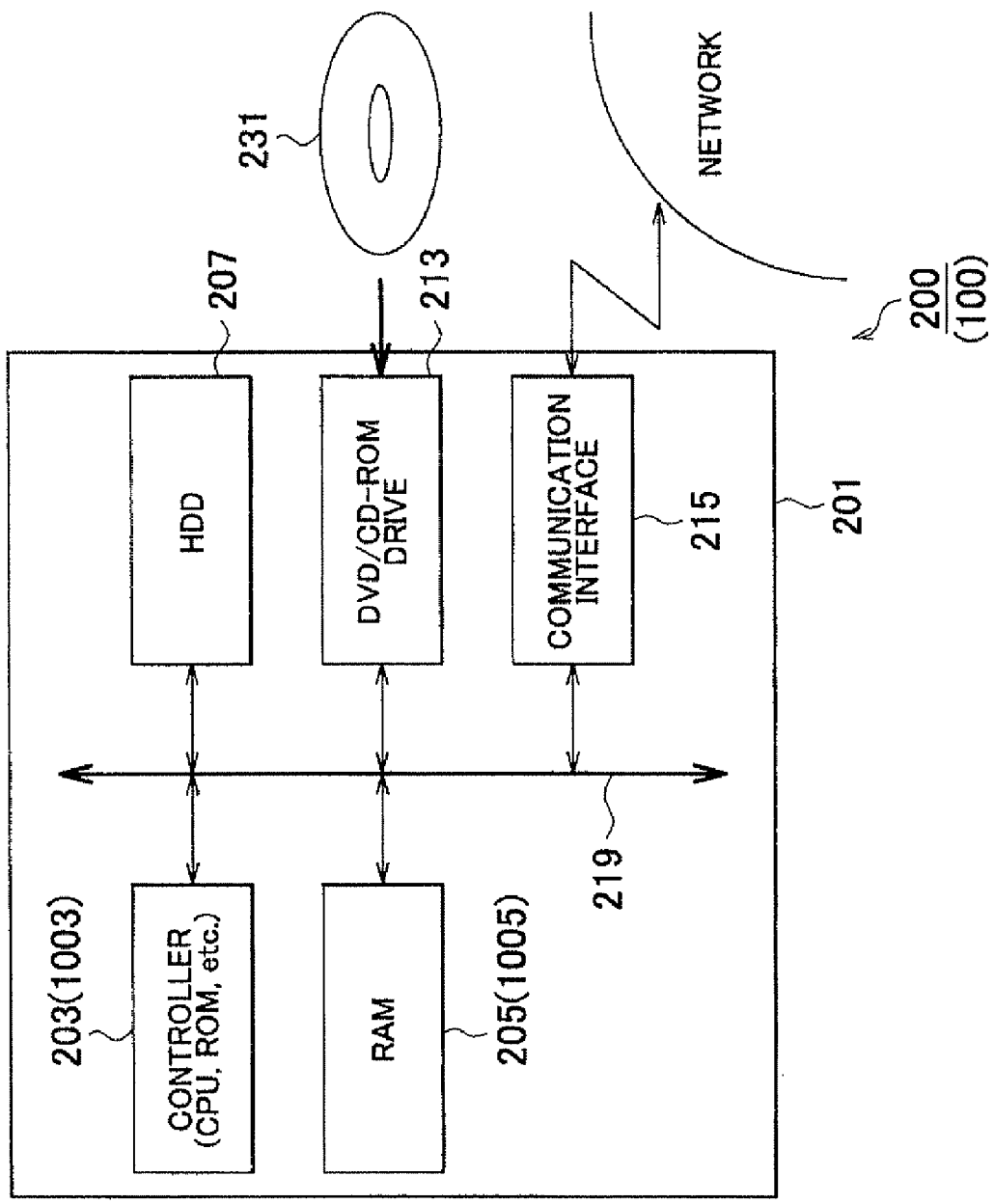

F I G. 4A

610

| USER ID | PW | FULL NAME | SEX | DATE OF BIRTH | ADDRESS | TELEPHONE NUMBER | ADDRESS | THE OTHERS, SUCH AS HOBBY |
|---|---|---|---|---|---|---|---|---|
| ... | ... | ... | ... | ... | ... | ... | ... | ... |
| 611 | 612 | 613 | 614 | 615 | 616 | 617 | 618 | 619 |

F I G. 4B

620

| USER ID | OWNED POINT | OBTAINED POINT | WAITING POINT INFORMATION | POINT-GIVEN ADVERTISEMENT |
|---|---|---|---|---|
| ... | ... | ... | DATE, AFFILIATE ID, GAME | ... |
| 621 | 622 | 623 | 624 | 625 |

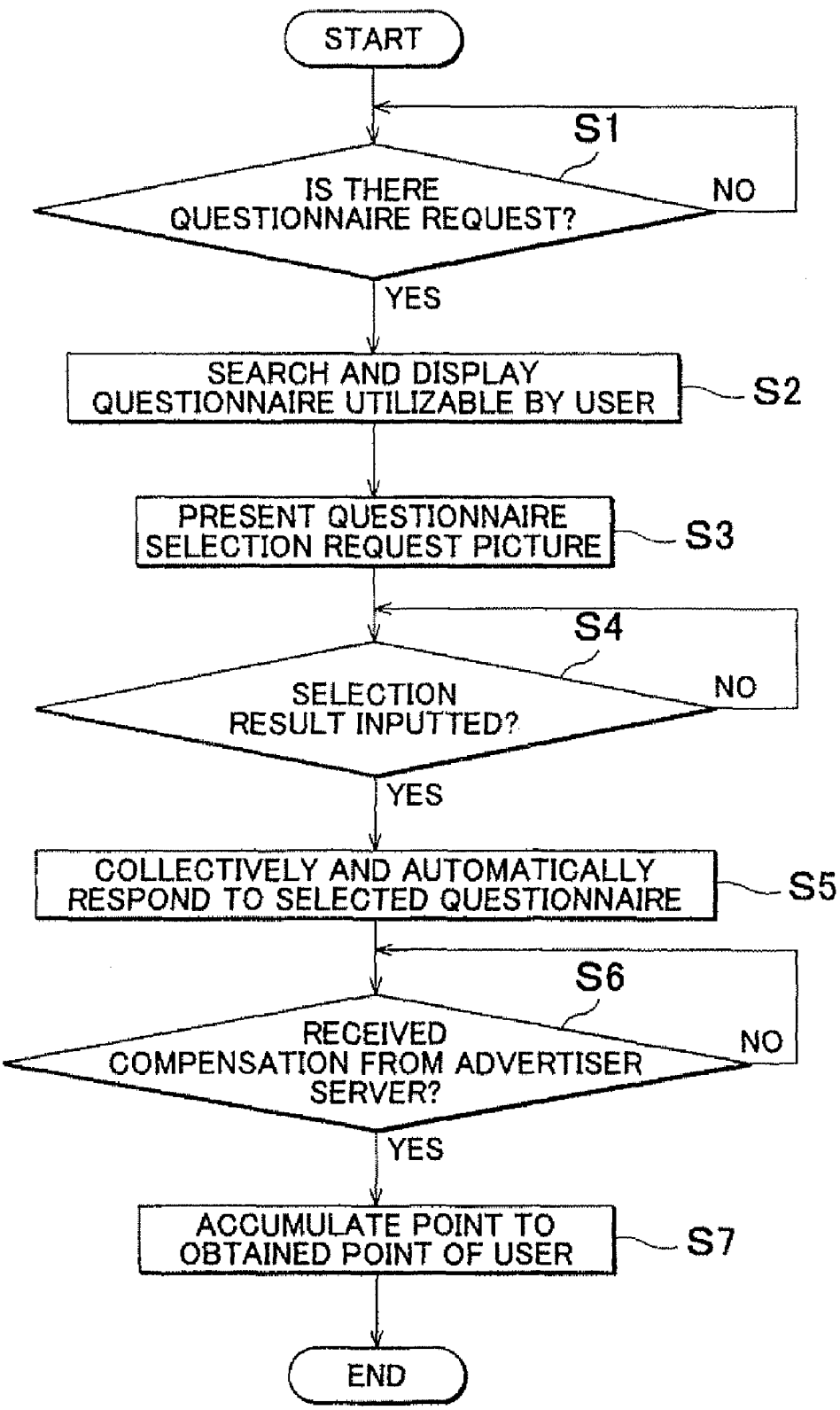

APPARATUS OF PLAYING CASINO GAME

CROSS REFERENCE TO RELATED APPLICATION

The present disclosure relates to subject matter contained in Korean patent application No. 2008-0090090 filed on Sep. 12, 2008, the disclosure of which is expressly incorporated herein by reference in its entirety.

FIELD OF INVENTION

This invention relates to an apparatus of playing casino game with which an on-line casino game can be enjoyed by a point to be obtained in exchange of personal information given from a user to an affiliate advertisement.

BACKGROUND OF THE INVENTION

In recent years, various kinds of companies provide various services through the Internet. Among such services, a merchandise selling site for selling ones' own products, a site through which a person can request materials on the company's own products for inducing the persons's interest therein and a site for accepting a deliver of a e-mail magazine are included. A huge number of sites are existent on the Internet, and it is inevitable for the companies which provides one's own services on the Internet to open a site on the Internet and to effectively advertise one's own products.

An affiliate advertisement is well known as one of methods of effectively advertising the site open on the Internet and services in such a site. A system of the affiliate advertisement is that an enterprise which opens a portal site attaches an advertisement which is linked to the site of another enterprise (an affiliate advertisement) to the portal site, and a predetermined compensation is paid to the enterprise which opens the portal site in reward for an access to the site of another enterprise by a user who visits the portal site through the affiliate advertisement (and a predetermined use in the site).

For example, a Japanese patent application publication No. 2001-117847 discloses a system combining the above-mentioned affiliate advertisement system with a system similar to a point card of a shop with each other. In such a system, a person who received services of an advertiser by utilizing the affiliate advertisement is also able to receive merits, point return, in addition to the person who opens the site on which the affiliate advertisement is published.

If the user provides his (her) personal information to the advertiser through a questionnaire of the advertiser when utilizing the affiliate advertisement of the portal site so as to obtain a predetermined point as its compensation, and plays a casino game which is provided on the portal site by using the obtained point, and the casino game is a slot machine, for example, it is necessary for the user to pay predetermined stakes every one game from his (her) obtained point.

The user may not continue the casino game due to his (her) reduced obtained point during playing the casino game. In such a case, it is necessary for the user to newly provide his (her) personal information to the advertiser on the portal site and to obtain the point to be used in the casino game as its compensation.

However, a predetermined time is necessary for such a work. In addition, the user is often awaken from his (her) excitements in the casino game while doing such works since it is necessary for the user to provide his (her) personal information to many affiliate advertisers in order to obtain the points necessary to continue such a game. Then, the user often stops to play the casino game, and at the same time, he (she) sometimes stops the works of providing the personal information.

Such a situation gives a bad impression on advertisement effects of the affiliate advertisement, and at the same time, the impression on the portal site which provides the casino game may be made bad.

Under these circumstances, an object of the invention is to provide the apparatus of playing casino game wherein it is possible to obtain the point necessary for continuation of the casino game in a short time by providing the personal information to the advertiser of the affiliate advertisement if the user plays the casino game with the point obtained by providing his (her) personal information to the advertiser of the affiliate advertisement and the user fears continuation of the casino game for the reason that the obtained point is decreased.

SUMMARY OF THE INVENTION

One aspect of the invention is an apparatus of playing casino game which connects with two or more terminal devices and two or more advertiser servers through a public communication line, comprising:
  means for presenting affiliate advertisement of said advertiser server to a user who operates said terminal device on said apparatus of playing casino game;
  point control means for sending personal information of said user to said advertiser server of said affiliate advertisement which is presented by said apparatus of playing casino game, which is selected by said user through an operation of said terminal device, and for giving a point received from said advertiser server as compensation to said user who selected said affiliate advertisement and storing an point obtained by accumulating given points in a predetermined memory as an obtained point for each user;
  casino game execution means for getting said user to play a casino game in such a way that casino game program is executed on said apparatus of playing casino game according to an instruction of said user through said terminal device or said casino game program downloaded into said terminal device is executed by said terminal device with at least a part of said obtained point as stakes;
  search means, for searching and extracting said affiliate advertisement to which said user can respond out of said affiliate advertisements, if said obtained point of said user who plays said casino game is judged to be a predetermined value or lower during execution of said casino game; and
  collective transmission instructing means, for instructing said point control means to collectively transmit said personal information of said user to said advertiser servers of said affiliate advertisements for all extracted affiliate advertisements.

According to this aspect of the invention, if continuation of the casino game is feared due to decrease of the obtained point, the search means searches and extracts the affiliate advertisements to which the user can respond out of the affiliate advertisements, and the collective transmission instructing means collectively transmits the personal information of the user regarding all extracted affiliate advertisements so as to obtain the point for continuation of the casino game. Therefore, it is not necessary for the user to separately respond to the respective affiliate advertisements, and the casino game can be restarted in a short time without needing many hours for such operations.

Another aspect of the invention is the apparatus of playing casino game, said search means further having:

means for producing an affiliate advertisement selection picture so as be selectable by said user from searched and extracted affiliate advertisements after searching and extracting said affiliate advertisements to which said user can respond and sending said picture to said terminal device of said user; and selection signal receiving means for receiving a selection signal which shows selection result of said affiliate advertisement according to said affiliate advertisement selection picture, which is sent from said terminal device of said user to said apparatus of playing casino game;

whereby said collective transmission instructing means deals with said affiliate advertisement selected by said selection signal as said all extracted affiliate advertisements.

In such a case, the affiliate advertisement selection picture is produced so as to invite the user to select the affiliate advertisement to be responded by the user and is sent to the terminal device of the user. So, the user can select the affiliate advertisement to which the user don't mind giving own personal information with the user's own intentions.

In addition, another aspect of the invention is the apparatus of playing casino game, said search means further having:

means for receiving a response request to said affiliate advertisement outputted from said terminal device;

whereby said search means judges that said obtained point of said user who plays said casino game became a predetermined value or lower when receiving said response request to said affiliate advertisement from said terminal device during execution of said casino game by said terminal device.

In this case, the user is possible to instruct the apparatus of playing casino game to collect the points to be obtained by the response to the affiliate advertisement at an optional point of time.

Furthermore, another aspect of the invention is the apparatus of playing casino game, said point control means further having:

point update means for subtracting a value of stakes of said user which has been consumed at the time of playing said casino game on said terminal device from a value of said obtained point corresponding thereto in said memory; and means for producing and outputting a response request to said affiliate advertisement, if a value of said obtained point in said memory is judged to be a predetermined value or lower;

whereby said search means judges that said obtained point of said user who plays said casino game became a predetermined value or lower when receiving said response request to said affiliate advertisement from said means for producing said response request during execution of said casino game by said terminal device.

The response request to the affiliate advertisement is automatically produced at a point of time when the value of the obtained point of the user becomes a predetermined point or lower during execution of the casino game, and a procedure for obtaining the point is executed. So, the user can obtain the point without responding to the affiliate advertisement.

BRIEF DESCRIPTION OF THE DRAWINGS

FIG. 3 is a block diagram of a structure of the server device of FIG. 1;

FIG. 4 is a view showing various kinds of data to be controlled by the server device of FIG. 1 in an embodiment of the invention;

FIG. 8 is a flowchart of an example of a personal information request program.

DESCRIPTION OF THE PREFERRED EMBODIMENTS

An embodiment of the invention is now explained, referring to appended drawings.

Figure 1:
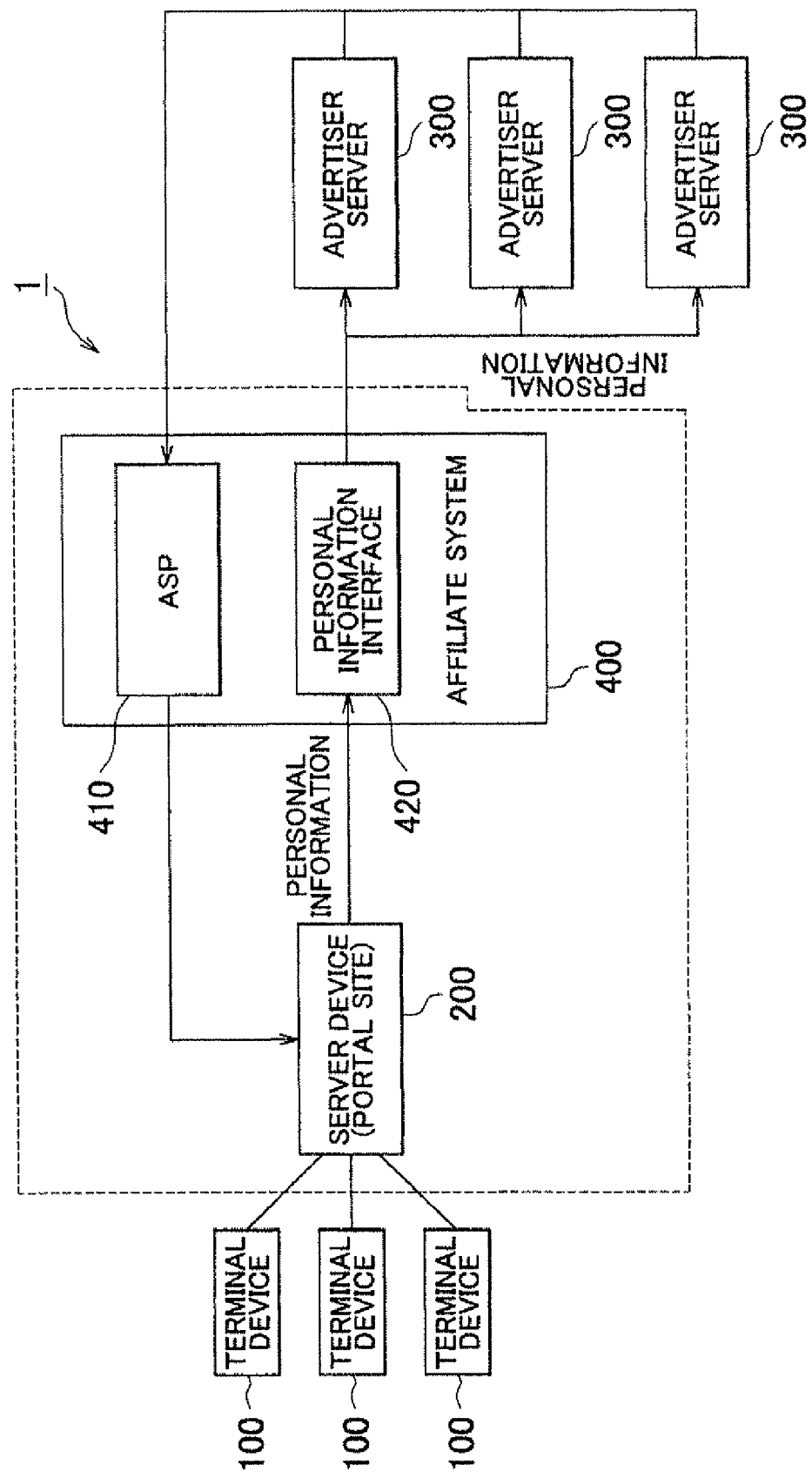
FIG. 1 is a block diagram which shows an example of a functional structure of an apparatus of playing casino game.

FIG. 1 is a block diagram showing a functional structure of a whole system to which an embodiment of the invention is applied. As shown in the figure, such a system is comprised of a server device 200 for providing a portal site, two or more terminal devices 100 for respective users who utilize the portal site, two or more advertiser servers 300 for respective advertisers for providing affiliate advertisements attaching non-battle games including a casino game mentioned hereinafter thereon in the portal site, and an affiliate system 400 for controlling an affiliate system of the advertisements. These are respectively connected with each other through a network, such as the Internet. An apparatus of playing casino game 1 according to the invention is comprised of the server device 200 and the affiliate system 400.

The portal site provided by the server device 200 provides various kinds of services, such as a bulletin board, a video chat and on-line battle game. Services according to a membership registration system are included in the services which can be utilized in such a portal site, and a part of services including pay services can be utilized through the terminal devices 100 if users who have registered predetermined personal information, such as address, full name, age, sex, e-mail address and hobby, in advance. "The pay service" in the specification may means that a compensation to be paid in exchange of the utilization of such service is only points to be delivered to the users. In addition, the server device 200 controls personal information of members.

As mentioned hereinafter, affiliate advertisements are attached on the portal site. If a user who accesses the portal site through the terminal device 100 clicks the affiliate advertisement displayed on the display of the terminal device 100 through an operation of an input device of the terminal device 100, a click signal is inputted into the server device 200 through a public communication line, such as the Internet. The server device 200 transmits predetermined information (including personal information of a user) to the advertiser server 300 by responding to a personal information request submission of which is requested in advance by an advertiser of the affiliate advertiser, and receives data which shows a compensation to the utilization of the affiliate from the advertiser server 300. When the user who registered a membership clicks the affiliate advertisement, the compensation received from the advertiser in connection with such a click is returned to the user as a point. Such point can be used for utilizing pay service in the portal site, for example. Details of the portal site is described hereinafter.

The advertiser server 300 is utilized by the advertiser of the affiliate advertisement (mentioned hereinafter) to be attached to the portal site provided by the server device 200, and manages sites for selling goods (including services), receives catalogue requests of goods, and delivers e-mail magazines. The advertiser server 300 receives predetermined personal information in the shape of answer to a personal information request from the server device 200 in exchange of utilization of the affiliate advertisement, and sends data of compensations thereto to the server device 200, corresponding such data to an affiliate ID on which a user ID is attached. In a system in this embodiment, the compensation to the utilization of the affiliate advertisement is not a result reward type, but a click type (but is substantially the same as the result reward type in the catalogue request of goods and delivery of the e-mail magazines). The personal information request in the specification includes all kinds of requests, such as catalogue requests and applications for prize, for requesting the personal information, such as address, full name, sex, occupation and hobby, in addition to the questionnaire.

The affiliate system 400 is comprised of an affiliate service provider (ASP) 410 and a personal information interface 420. The ASP 410 is similar to an ASP in a conventional affiliate system, and issues an affiliate ID of the affiliate advertisement attached on the portal site. If the user who utilized the affiliate advertisement is a registered member, a user ID is correlated with the affiliate ID which is sent to the advertiser server 300.

The personal information interface 420 edits the personal information of the user which is sent from the server device 200 in response to a click of the affiliate advertisement into a personal information request form which an advertiser requests, and sends such a form to the advertiser server 300. The personal information interface 420 stores the personal information of the user requested by the advertiser in the shape of the personal information request form for each affiliate advertisement, and the personal information request forms of the respective affiliate advertisements are respectively different from each other in their necessary items of the personal information or orders of the items to be described. The personal information interface 420 edits the respective items of the personal information of the user which is sent from the server device 200 according to the personal information request form, and enters data in the personal information request form. There may be some affiliate advertisements which do not register the personal information request forms. In such a case, the personal information of the user which has been sent from the server device 200 is sent to the advertisement server 300 as it is.

Figure 2A:
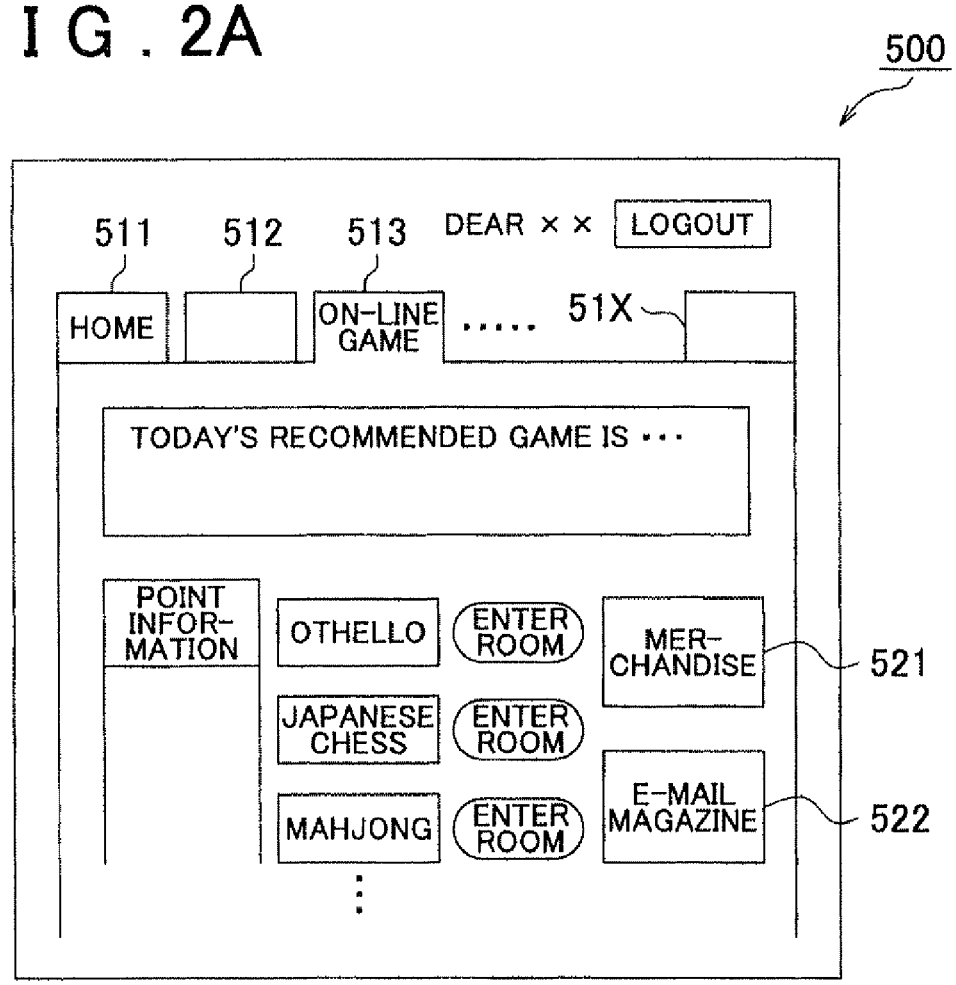
FIG. 2 is a view of a structure of a portal site provided by a server device of FIG. 1.

FIG. 2 is an example of a picture structure of the portal site provided by the server device 200. This picture is one after the user who has already registered the personal information, such as full name and address, so as to be registered as a service user logs in a member site by inputting a member ID and/or a password. As shown in FIG. 2(a), on a portal site 500, a kind of service which the user utilizes can be selected by clicking tabs 511 through 51x, and the tab 513 for utilizing on-line game service including a casino game is included therein.

Figure 2B:
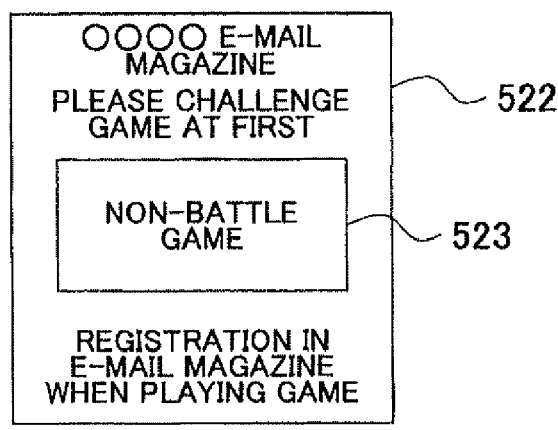

A controller 203 of the server device 200 attaches two or more affiliate advertisements (means for presenting affiliate advertisement) on a page showing services which appear by clicking tabs 511 through 51x on the portal site 500, and an affiliate advertisement 521 of products (including services) and an affiliate advertisement 522 of an e-mail magazine registration are included therein. Advertisers of the affiliate advertisements 521 and 522 may be changed, but a non-battle game 523, such as a casino game, is added to the affiliate advertisement 522 of the e-mail magazine registration even if who is the advertiser of such an advertisement, as shown in FIG. 2(b). The non-battle game is similarly added to the affiliate advertisement 521 for products. In case of a non-member site, the non-battle game is not added to the affiliate advertisement. It is not necessary to display both the affiliate advertisements 521 and 522 and the non-battle game 523, such as the casino game, as a unit, as shown in FIG. 2(b), and the non-battle game 523 may be displayed on the portal site 500, independent of the affiliate advertisements 521 and 522.

The non-battle game 523 is a game, such as a slot lottery, a roulette and a bingo game, where one user of each terminal device 100 can enjoy without the other users, and such game is started when clicking the affiliate advertisement 511 or 522 including such a game. When clicking the affiliate advertisement 522, the personal information of the user is sent to the advertiser server 300 of the advertiser, and the user is registered as a delivery destination of an e-mail magazine which the advertiser publishes. When clicking the affiliate advertisement 521, a picture of a merchandise selling site of the advertiser is set up by a pop-up window.

When the user clicks the affiliate advertisement 521, 522, the non-battle game 523 is executed, and a predetermined point according to results of the game, which is a part of the compensation to be paid from the advertiser of the affiliate advertisement 521, 522 to the portal site, is returned to the user. The user may obtain some points by clicking the affiliate advertisement 521, 522, or may obtain by another method, such as by a casino game, as described hereinafter.

Regardless to say, an expected value of the point which each user can obtain by clicking the affiliate advertisement 521, 522 or according to the results of the non-battle game which the user plays after clicking is lower than the compensation which a manager of the portal site receives from the advertiser.

In this embodiment, the server device 200 controls the points of each user, being divided into two kinds, an obtained point and an owned point. The obtained point is controlled as a point necessary for participation of the on-line game, such as the non-battle game, and the owned point is controlled as a point for utilizing the other pay services excluding the on-line game. Then, the owned point of the user (the point to be used for pay service) is not reduced by the on-line battle game (but may be increased according to the results of the game), but the obtained point necessary for participation of the on-line game is reduced in such a manner that when participating in the on-line game, the point corresponding to stakes necessary for the on-line game and the point necessary for the participation of the game are separately subtracted or both points are totally subtracted from the obtained point which the user owns and the obtained point is renewed thereby. The point which the user obtained by a result of the on-line game maybe added to the obtained point only which is newly necessary for the participation of the on-line game, may be added to the owned point only for utilizing the pay service, or may be added to both, the obtained point and the owned point.

FIG. 3 is a block diagram which shows a structure of the server device 200 for providing the portal site of FIG. 1. As shown in the figure, the server device 200 is structured with a server body 201 as its center. The server body 201 includes the controller 203, a RAM 205, a hard disk drive (HDD) 207, a DVD/CD-ROM drive 213 and a communication interface 215 which are respectively connected through an internal bus 219. A storage medium (DVD-ROM or CD-ROM) 231 can be installed on the DVD/CD-ROM drive 213.

The controller 203 including a CPU (Central Processing Unit) and a ROM (Read Only Memory) executes program stored in the HDD 207 or the storage medium 231, and controls the server device 200. The controller 203 has an internal timer which clocks a present time. The ROM 205 is a work area of the controller 203. The HDD 207 is a storage area for storing programs and data. The communication interface 215 which is connected with a public communication line, such as the Internet, communicates with the terminal devices 100.

The program and data for playing the on-line game with the server device 200 are firstly stored in the storage medium 231, for example, and are installed therefrom into the HDD 207. Such program and data which are read out of the HDD 207 at the time of execution are loaded to the RAM 205. The controller 203 processes the program and data which were loaded to the RAM 205, and advances the on-line game on the basis of messages respectively delivered from the terminal devices 100. Intermediate data during processing by the controller 203 are stored in the RAM 205.

The advertiser server 300 and the affiliate system 400 of FIG. 1 have a structure almost similar to one of the server device 200 which provides the portal site. The terminal device 100 of FIG. 1 has a display for displaying information of the portal site provided by the server device 200 and at least an input device for inputting information, such as a keyboard and a mouse, in addition to the structure of the server device 200 as shown in FIG. 3. A hardware of each of the above-mentioned devices 100, 200, 300 and 400 is comprised of a computer which center is a CPU, and various functions can be time-dividedly exercised when the CPU executes predetermined program. However, each device may be structured in such a manner that various kinds of functions to be exercised by an execution of the program by the CPU are executed by each dedicated hardware, and in such a case, each hardware may be controlled by a computer.

Subsequently, various kinds of data necessary for actualizing processes in a system in this embodiment are now explained. FIG. 4 is a view which shows various kinds of data to be controlled by the server device 200 for actualizing the processes in the system in this embodiment. FIG. 4(a) is a user table 610 which is stored in memory means, such as the HDD 207 of the server device 200, and FIG. 4(b) is a point control table 620.

The user table 610 as shown in FIG. 4(a) is a table which stores user ID 611, password 612, full name 613, sex 614, age 615, address 616, telephone number 617, e-mail address 618 and the other information 619 for each user. Respective information items stored in the user table 610 have already been registered by each user when registering a membership. Since a method for such membership registration or for logging in a members site is similar to a conventional one, detailed explanation thereof is not described.

The user ID 611 is identification information for identifying each user, and is necessary for each user for logging-in the members site, and is sent to the advertiser server 300 together with the affiliate ID of the affiliate advertisement 521 or 522 when clicking the affiliate advertisement 521 or 522. The password 612 is identification information necessary for each user for logging-in the members site together with the user ID 611.

Full name 613 is a full name of the user which membership has already been registered, and a first name and a last name, and their Furigana (Japanese reading aid) are registered therein. As Furigana, only one kind of half width Katakana (Katakana means the square form of kana), full width Katakana and a full width Hiragana (Hiragana means the cursive kana characters) is registered in the user table 610, but the personal information system 420 may convert the kinds of characters. The sex 614 is the sex of the user who has been registered as a member, and the age 615 is date of birth of the user who has been registered as a member. In addition, the address 616, the telephone number 617 and the e-mail address 618 are respectively the address, the telephone number and the e-mail address of the user who has been registered as a member.

Figure 5:
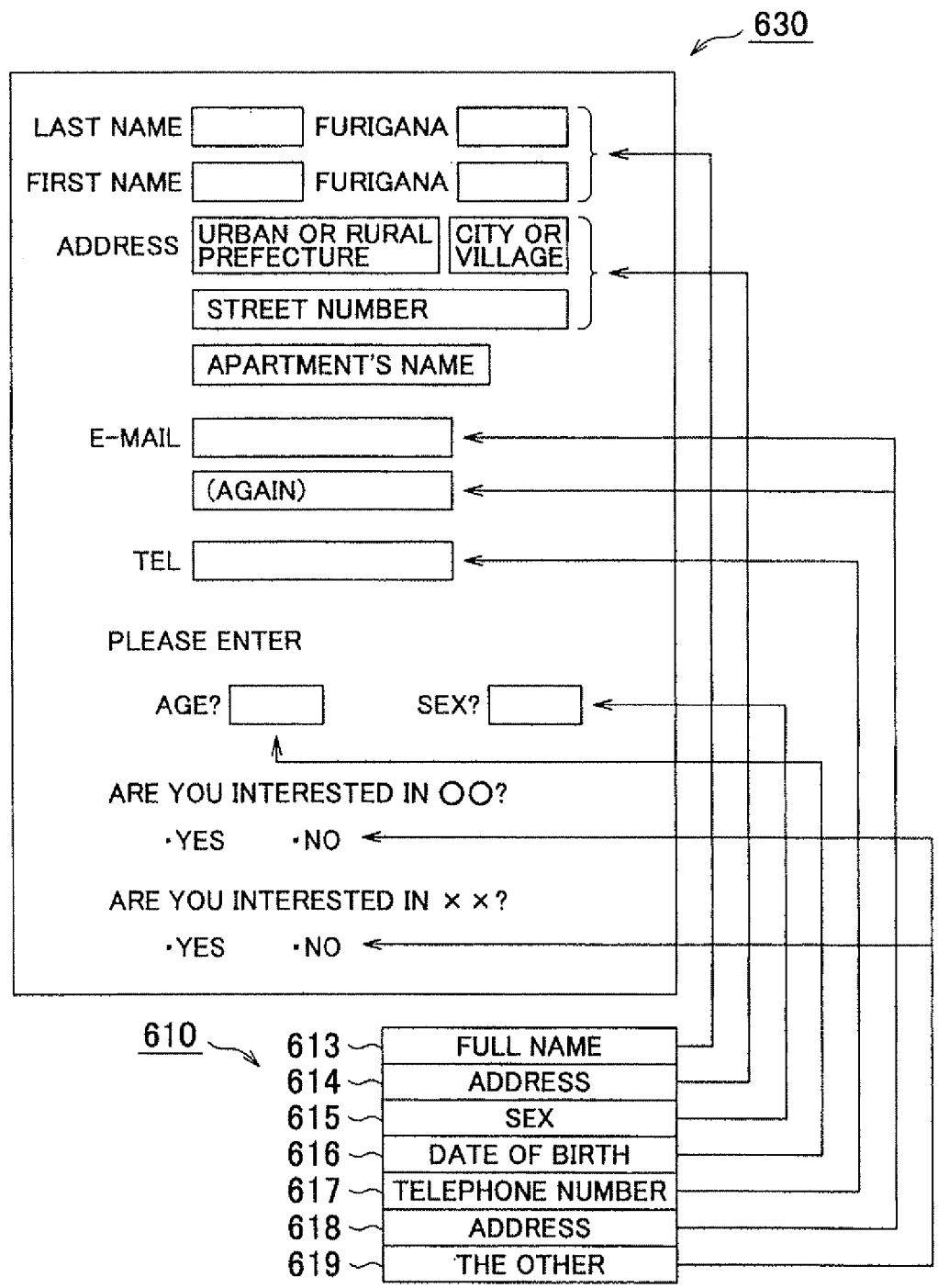
FIG. 5 is a view of an example of editing of personal information sent from a personal information interface in FIG. 1 to an advertisement server according to a form requested by the advertiser.

As the other information 619, various kinds of information, such as a hobby, a job and a family structure of the user, the registered member, are registered. It is not necessary to always register all of respective items as the other information 619. However, if a number of the registered items is small, kinds of the advertisements attached to the members site for the users as the affiliate advertisement 522 are limited. In other words, the affiliate advertisement 522 can be considered to be a medium for collecting the personal information of the user who operates the terminal device connected with the server device 200, and has such a function that the user is invited to answer the personal information in the shape of a form as shown in FIG. 5, for example, when clicking (selecting) the affiliate advertisement and the personal information of the user is collected and sent to the advertiser in exchange for giving the user a predetermined point. However, when the advertiser of the affiliate advertisement 522 requests the personal information of the user to be classified into the other information 619 and the user does not register such information, the controller 203 of the server device 200 does not select the affiliate advertisement of the advertiser as the advertisement to be presented to the user when selecting the affiliate advertisement to be presented to the user as the portal site, and such advertisement is not attached to a picture of the members site for the user.

The point control table 620 as shown in FIG. 4(b) is a table which stores a user ID 621, an owned point 622, an obtained point 623, a waiting point information 624 and a point-given advertisement 625 for each user. The user ID 621 is the same as the user ID 611 registered in the user table 610, and is identification information of each user.

The owned point 622 is a total point which each user presently owns, and is the point remaining after reducing the point which is used for pay services from the total point obtained by clicking of the affiliate advertisement 521, 522 or participation of the on-line game. The owned point 622 is not decreased so long as the user utilizes no pay service. On the other hand, the obtained point 623 is the point remaining after reducing the point which is used at the time of the participation of the on-line game from the point obtained by clicking the affiliate advertisements 521, 522. For example, if the user obtains 150 points by clicking the affiliate advertisement 521 or 522 and obtains 50 points by participating in the on-line game for which 100 points is necessary when having no owned point and no obtained point, the owned point 622 becomes 200 points which is a total of 150 points obtained by the clicking the affiliate advertisement 521 or 522 and 50 points obtained by on-line game, and the obtained point 623 becomes 50 points after subtracting 100 points which is necessary for the participation of the on-line game from 150 points obtained by clicking the affiliate advertisement 521 or 522. That is, the owned point is the point which is accumulated for receiving pay services. Any name for such accumulated point is available.

The waiting point information 624 is information on the affiliate advertisement 521, 522 for which the point has not yet been given after the clicking by the user. After sending data which shows the compensation from the advertiser server 300, the point by clicking the affiliate advertisement 521 or 522 is given. Date and time of clicking, the affiliate ID of the clicked affiliate advertisement 521 or 522 and game results at such time are included in the waiting point information 624.

The point-given advertisement 625 is record information on the affiliate advertisement 521, 522 clicked by the user by which the point has already been given. The affiliate advertisements 521, 522 which are attached to the members site are preferentially selected from the advertisement having no such record that the point has been given to the user, but such selection also depends on the item registered in the other information 619. One user may have two or more waiting point information 624 or two or more point-given advertisements 625, or may have no waiting point information 624 or no point-given advertisement 625.

Subsequently, how to edit the personal information in the personal information interface 420 of the affiliate system 400 is now described. FIG. 5 is a view which shows an example of an edit of the personal information according to a personal information request form 630 requested by the advertiser. As described before, the personal information request form 630 requested by the advertiser has already been registered in the personal information interface 420 for each affiliate advertisement 522. In addition, the personal information of each user is registered in the user table 610, from the full name 613, the sex 614, the date of birth 615, the address 616, the telephone number 617, the e-mail address 618 and the other information 619 in its order.

The personal information request form 630 as shown in FIG. 5 has various kinds of input blanks, such as respective input blanks for a last name and its Furigana, and a first name and its Furigana, the input blanks for urban or rural prefecture, city name and street number and apartment name, two input blanks for e-mail address, the input blank for a telephone number, the input blank for an age, the input blank for a sex, and the input blank for responding whether or not the person is interested in ○ ○, the input blank for responding whether or not the person is interested in X X. When clicking the affiliate advertisement 522, the personal information of the user is sent from the server device 200 to the personal information interface 420 in the order registered in the user table 610. However, a way of entering the personal information and its entering order in the personal information request form 630 is of course different from a storing way and a storing order of the personal information data stored in the user table 610 which is sent from the server device 200. For this reason, the personal information interface 420 checks the respective items of the personal information data which is stored in the user table 610 which is sent from the server device 200 and the respective items of the personal information data requested by the personal information request form 630 which has been set and registered by the advertiser, and correctly enters the corresponding personal information in the respective sections of the personal information request form 630.

The full name 613 stored in the user table 610 is entered in both sections in the personal information request form 630, being divided into two. If the information which is sent from the user table 610 is Furigana of Katakana and Furigana of Hiragana is requested in the personal information request form 630, Furigana of Katakana is converted into Hiragana and the converted is entered in each section of the personal information request form 630. The address 616 stored in the user table 610 is entered in respective sections in the personal information request form 630 in advance of the sex 614 and the date of birth 615, being divided into urban or rural prefecture, city or village, street number and apartment's name. The e-mail address 618 stored in the user table 610 is twice entered in both sections in the same way in the personal information request form 630 in advance of the sex 614, the date of birth 615 and the telephone number 617, which storing way is different from one in the user table 610. The telephone number 617 is also entered in the appropriate input section in the personal information request form 630 in advance of the sex 614 and the date of birth 615.

The date of birth 615 is entered in the personal information request form 630 in advance of the sex 614. Since the personal information request form 630 requests the age, the personal information interface 420 computes the age of the user at this point of time from the data of the date of birth 615 of the user table 610 and enters the age in an appropriate input section. The sex 614 is entered in the section after the e-mail address, the telephone number and the age in the personal information request form 630. Furthermore, YES or NO is selectively entered in the sections for responding as to whether you have an interest in ○ ○ or you have an interest in XX by selecting by the personal information interface 420 according to the personal data showing hobbies of the registered users as the other information 619.

Procedures to be executed in the system in this embodiment are now described. In this case, a membership registration of the user and logging in the server device 200 from the terminal device 100 are executed by procedures the same as a conventional system. The following is mentioned on the assumption that such procedures have already been conducted.

A production of the member site which the registered member user logs in is not detailedly mentioned here since it is the same as a conventional system excluding in such points that the non-battle game 523 is attached to the affiliate advertisements 521, 522 and there is the above-mentioned limitation in a selection of the affiliate advertisements 521, 522. A way of utilizing the member site including use of the owned point is not detailedly mentioned here since such a way is the same as the conventional way.

When the user logs in the server device 200 with the user ID and the password in the terminal device 100, the members site produced by the server device 200 (see FIG. 2) is displayed on the display. When the members site is reloaded by a renewal of a page, reloaded members site is displayed on the display. The user operates the input device and clicks the affiliate advertisement 521, 522 if he (or she) is interested in the goods attached as the affiliate advertisement 521, he wishes to request to send a e-mail magazine attached to the affiliate advertisement 522 or materials, and or he wishes to obtain the point by playing non-battle game 523, such as a casino game. The user clicks the non-battle game 523 portion if the non-battle game 523, such as the casino game is attached to the members site, independent of the affiliate advertisement 521, 522 and he (or she) wishes to play the non-battle game 523.

When clicking the affiliate advertisement 521, 522, the user executes the non-battle game 523 attached to the affiliate advertisement on the terminal device 100 side, and the affiliate ID of the clicked affiliate advertisement 521, 522 is sent to the server device 200 together with the results of the executed game. The point to be distributed to the user by clicking the affiliate advertisements 521, 522 can be confirmed in the terminal device 100 when the user logs in the user site again, the user site is reloaded or a point update is requested by the terminal device 100 on condition that data showing a compensation has been sent from the advertiser server 300 to the server device 200.

When clicking the affiliate advertisement 521, a browser is actuated as another process in the terminal device 100, and a merchandise selling site corresponding to the affiliate advertisement 521 is displayed on the display after accessing such a site. Procedures to be conducted in the terminal devise 100 on which the merchandise selling site is displayed, and procedures to be conducted in a computer (may be the advertiser server 300) which provides the merchandise selling site are not detailedly mentioned here since such procedures are the same as conventional ones. If the advertiser server 300 provides the merchandise selling site, however, in the advertiser server 300, the user can save a work for inputting the personal information, such as a destination of the goods and a destination of a confirmation e-mail with the personal information sent from the user table 610 of the server device 200 through the personal information interface 420.

If the user selects the execution of the casino game which is an on-line game (non-battle type of game) in the terminal device 100, the procedures for proceeding of the casino game are executed in the server device 200 even if the casino game is attached to the affiliate advertisements 521, 522 or is independently attached to the member site. Such procedures are not mentioned here since these are the same as ones in a conventional on-line casino game. The point distributed according to the result of the casino game can be also confirmed in the terminal device 100 when the user logs in the user site again, the user site is reloaded or a point update is requested by the terminal device 100.

Figure 6:
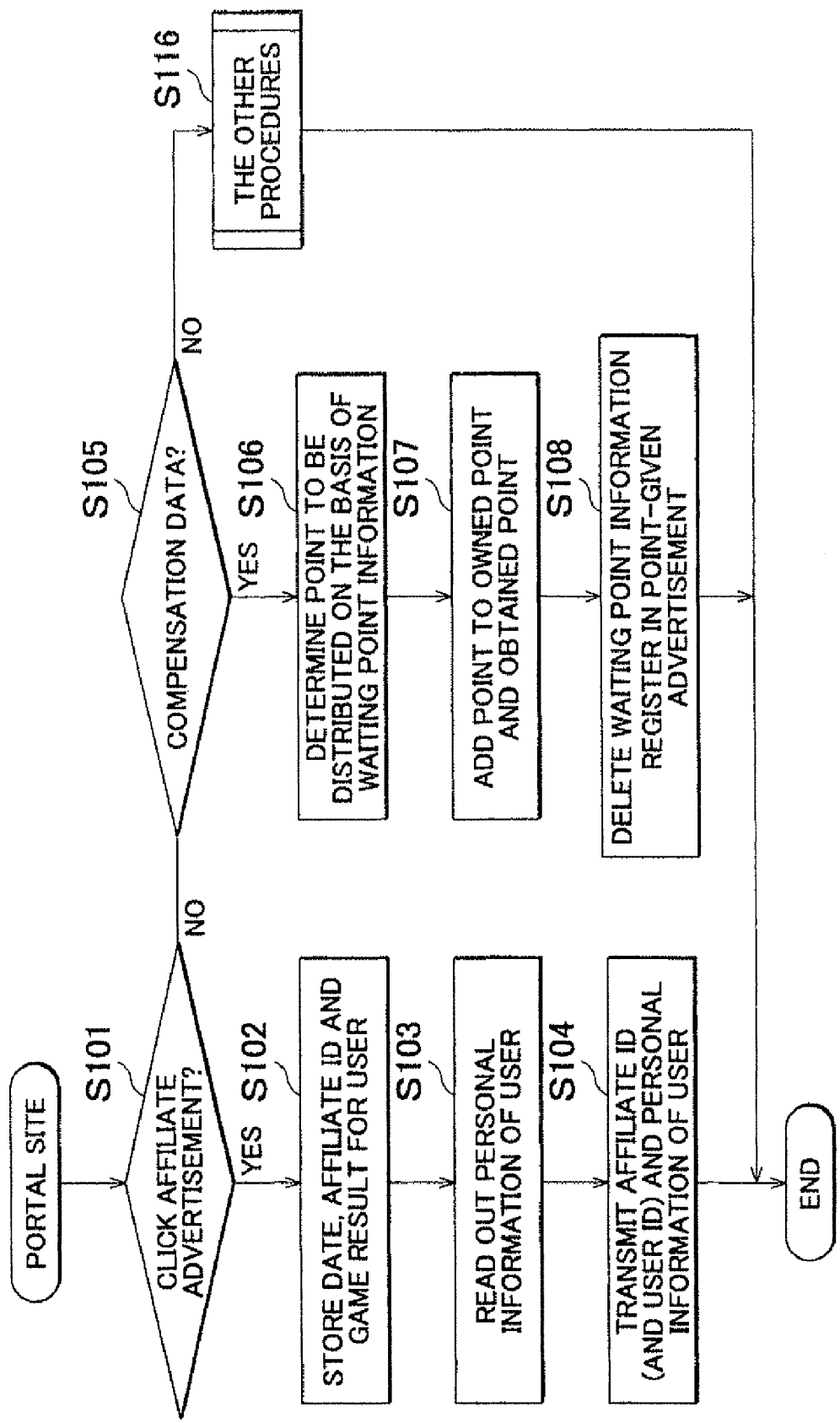
FIG. 6 is a flowchart showing routines to be executed by the server device of FIG. 1 in the embodiment of the invention.

Subsequently, the procedures in the server device 200 are now mentioned. FIG. 6 is a flowchart showing the procedures to be executed in the server device 200 which provides the portal site in order to actualize the procedures in this system. The procedures shown in such a flowchart are executed whenever the communication interface 215 of the server device 200 receives information, and are executed for each information received. In other words, two or more procedures in the flowchart of FIG. 6 may be simultaneously executed in the server device 200.

In the server device 200, the controller 203 receives the information from the outside and judges whether or not the received information is the affiliate ID which is sent from any of the terminal devices 100 by the result of the non-battle type game 523 which is conducted by clicking the affiliate advertisements 521, 522 (Step S101). If the information received by the server device 200 is the information which was sent from each terminal device 100 according to the result of the non-battle type game 523 which is conducted by clicking the affiliate advertisements 521, 522, the controller 203 functions as point control means, and registers present date and time, the affiliate ID and the game result which was sent together with the affiliate ID in the point control table 620 as the waiting point information 624 corresponding to the user ID of the terminal device 100 (Step S102).

Subsequently, the controller 203 reads the personal information of the user which has been registered so as to correspond to the user ID 611 in the user table 610 regarding the user ID of the terminal device 100, such as the full name 613, the sex 614, the date of birth 615, the address 616, the telephone number 617, the e-mail address 618, and the other information 619 (Step A103). The controller 203 sends the received affiliate ID to which the user ID of the terminal device 100 is added (is bound) to the personal information interface 420 of the affiliate system 400 together with the personal information of the user which has been read out of the user table 610 (Step S104). And, the procedures in this flowchart finish.

When receiving the affiliate ID to which the user ID was attached from the server device 200, the personal information interface 420 of the affiliate system 400 reads the personal information request form of the corresponding advertiser which has been registered in advance so as to correspond to the affiliate ID. And, the personal information interface 420 edits the personal information which is requested by the read personal information request form 630 and writes the information therein on the basis of the personal information of the user table 610 which has been sent from the server device 200 with the affiliate ID, and the personal information request form 630 to which writing and editing finished is sent to the corresponding advertiser server 300 together with the affiliate ID. If the personal information request form 630 corresponding to the affiliate ID which has been received from the server device 200 has not been registered in the personal information interface 420, the personal information of the user table 610 which has been received from the server device 200 is sent to the advertiser server 300 as it is.

If the information received from the server device 200 in Step S101 is not the affiliate ID sent according to the clicking of the affiliate advertisements 521, 522, the controller 203 judges as to whether or not the received information is data which shows the compensation to the clicking of the affiliate advertisements 521, 522 which has been sent from the advertiser server 300 (Step S105).

If the data is one which shows the compensation to the clicking of the affiliate advertisements 521, 522, the controller 203 of the server device 200 reads the waiting point information 624 registered in the point control table 620 of the user which corresponds to the user ID 621 according to the affiliate ID corresponding to the data which shows the compensation and the user ID attached thereto. And, the controller 203 determines the point to be returned to the user out of the data which shows the compensation according to game result which the waiting point information 624 shows (Step S106).

The controller 203 of the server device 200 adds the point determined in Step S106 to the owned point 622 and the obtained point 623 of the user (Step S107). After addition to the owned point 622 and the obtained point 623, the controller 203 deletes the waiting point information 624 registered in the point control table 620 according to the affiliate ID corresponding to the data which shows the compensation and the user ID attached thereto, and registers the affiliate advertisement which the affiliate ID shows as the point-given advertisement 625 of the user (Step S108). Then, the procedures in this flowchart finish.

If the information received in Step S105 is not the data which shows the compensation to the clicking of the affiliate advertisements 521, 522, but the information (signal) which requests the server device 200 to do the other procedure, the controller 203 does respective procedures according to the received information (signal). Such procedures are not mentioned here since these do not have direct relation with the invention (Step S116). After finishing the respective procedures according to the received information, the procedures in this flowchart finish.

Procedures in the ASP 410 of the affiliate system 400 are not mentioned here since such procedures are the same as conventional ones excluding such a point that the user ID is attached to the affiliate ID to be received and sent. In addition, the procedures in the advertiser server 300 are not mentioned here since such procedures are the same as conventional ones excluding such a point that the received personal information is not the personal information which the user inputs in the terminal device 100, but is the information read out of the user table 610 of the server device 200, and is edited in the personal information interface 420.

The affiliate advertisement is attached to the portal site which the server device 200 provides in this embodiment, as mentioned above. This affiliate advertisement induces persons to access the merchandise selling site provided by the advertiser, and advertises distribution of an e-mail magazine from the advertiser, and through the affiliate advertisement, persons can request materials of merchandises of the advertiser.

A person which provides a conventional general affiliate advertisement has such a merit that such person can obtain the compensation according to the utilization of such advertisement, but the user of such an affiliate advertisement, such as a person who enters the merchandise selling site through the affiliate advertisement so as to buy merchandises, and the person who enters a merchandise material request page or an e-mail magazine distribution request page so as to request the material or the distribution of the e-mail magazine, has not a big merit. In addition, even if the user utilizes the affiliate advertisement of a different advertiser, it is necessary to input the personal information in the site of the advertiser every utilization of the advertisement. For this reason, the utilization of the affiliate advertisement by the user is not promoted.

On the contrary, services in a member registration system are included in the services to be utilized in the portal site provided by the server device 200 in this embodiment, and the services in the member registration system can be utilized if the personal information is registered in the user table 610 in advance and then the user logs in the member site. The affiliate advertisements 521, 522 are also attached to such a member site, and the user can access the merchandise selling site provided by the advertiser, and can request the material of the merchandise provided by the advertiser or a distribution of the e-mail magazine when clicking the affiliate advertisements 521, 522 through the input device in the terminal device 100.

When the user clicks the affiliate advertisements 521, 522 attached to the member site, the server device 200 reads the personal information of the user out of the user table 610, adds the user ID 611 to the affiliate ID and sends the personal information 613 through 619 of the user to the advertiser server 300.

Then, the member registered user can easily utilize the services advertised by the advertiser through the affiliate advertisements 521, 522 since it is not necessary to individually input the personal information in the site of the advertiser through the input device of the terminal device 100 after clicking the affiliate advertisements 521, 522.

When the registered member user utilizes the service provided by the advertiser through the affiliate advertisements 521, 522, the data which shows the compensation to the clicking of the affiliate advertisements 521, 522 is sent from the advertiser server 300 to the server device 200, that is, the compensation is paid from the advertiser to the provider of the portal site, and a part of the compensation is returned to the user which utilized the affiliate advertisements 521, 522 as the point which can be used for utilization of pay services.

The user can obtain such a merit that a predetermined point can be returned to himself (herself) if the user utilizes the service provided by the advertiser through the affiliate advertisements 521, 522 attached to the member site, so the utilization of the affiliate advertisements 521, 522 attached to the member site is motivated. In addition, the non-battle game 523, such as a casino game, is attached to the affiliate advertisements 521, 522, and such a game has such a fun that the point to be returned depends on the game results. Having a game element in the point to be returned may motivate the utilization of the affiliate advertisements 521, 522 by the user.

Increase of the number of users who utilize the affiliate advertisements 521, 522 can be expected by such a motivation to the users in the portal site provided by the server device 200, especially in the member site. And, this expectation regarding the increase of users may be the merit for the advertiser at the time of providing of the affiliate advertisements 521, 522 in the portal site provided by the server device 200, especially in the member site. Then, the increase of business persons who wish to provide the affiliate advertisements 521, 522 in the portal site provided by the server device 100, especially in the member site can be expected.

Furthermore, the persons who open the portal site in the server device 200 can expect increase of the compensation to be obtained from the advertisers by the increase of the business persons who wish to provide the affiliate advertisements 521, 522 in the portal site, especially in the member site and the increase of opportunities of the utilization of the affiliate advertisements 521, 522 by the users, and can obtain many merits by an open of the portal site.

The advertisers of the affiliate advertisements 521, 522 obtain the personal information of the user when the advertiser's affiliate advertisements 521, 522 are clicked. The personal information request forms which request items of the necessary personal information and their input orders can be registered in advance in a memory in the personal information interface 420 of the affiliate system 400 every kind of the affiliate advertisement. When clicking the affiliate advertisements 521, 522, the personal information of the user which is sent from the server device 420 is edited according to the form requested by the advertiser by the personal information interface 420 and is sent to the advertiser server 300.

Then, the user can easily utilize the services in the affiliate advertisements 521, 522 provided by the advertiser without being conscious of the form requested by the affiliate advertisements 521, 522. On the other hand, the advertiser which provides the affiliate advertisements 521, 522 can also receive the personal information of the items necessary for himself (herself), and the publication of the affiliate advertisements 521, 522 in the portal site provided by the server device 200, especially in the member site is motivated thereby.

In addition, the non-battle type of the game, such as a casino game, is attached to the affiliate advertisements 521, 522. Main object of some users may be to play the non-battle game 523 (or to obtain the point by playing the non-battle game 523) rather than to receive the services provided by the advertiser in the affiliate advertisements 521, 522. Such users can easily play the non-battle game 523 only by clicking the affiliate advertisements 521, 522 or selecting the non-battle game through a clicking operation on condition that the personal information is registered in advance.

On the other hand, the advertisers of the affiliate advertisements 521, 522 can increase real users of the services advertised in the affiliate advertisements 521, 522 since even if the original object of the users is to play the non-battle game 523, such as the casino game, some percentage of such users may purchase merchandises in the merchandise selling site or may read the merchandise material or the e-mail magazine.

The controller 203 of the server device 200 can exercise a function as casino game execution means as one of multi tasks by executing proper control program stored in the HDD 207. With such casino game execution means, the user can execute the casino game online in the portal site 500 through the terminal device 100 by executing the casino game program stored in the HDD 207 by the controller 203 or offline on the terminal device 100 by downloading the casino game program stored in the HDD 207 from the server device 200 into the terminal device 100. The casino games are the non-battle games 523, such as slot machines, roulettes and cards. Various kinds of casino games are known, and in any of these casino games, the game starts in such a state that optional or predetermined amount of money is staked as stakes and the stakes of the users are returned to the user, depending on victory or defeat of the game according to a predetermined refund rate which is zero or higher.

In such casino games, a time from staking money to finish of the game is generally rather shorter, and in many cases much money is staked in a short time. If in the casino game, the stakes of the casino game are covered by the point to be received in response to the personal information request form 630 of the corresponding advertiser after clicking the affiliate advertisements 521, 522, the owned point to be used for the casino game may be short due to repeating the casino game several times by the user.

Figure 7:
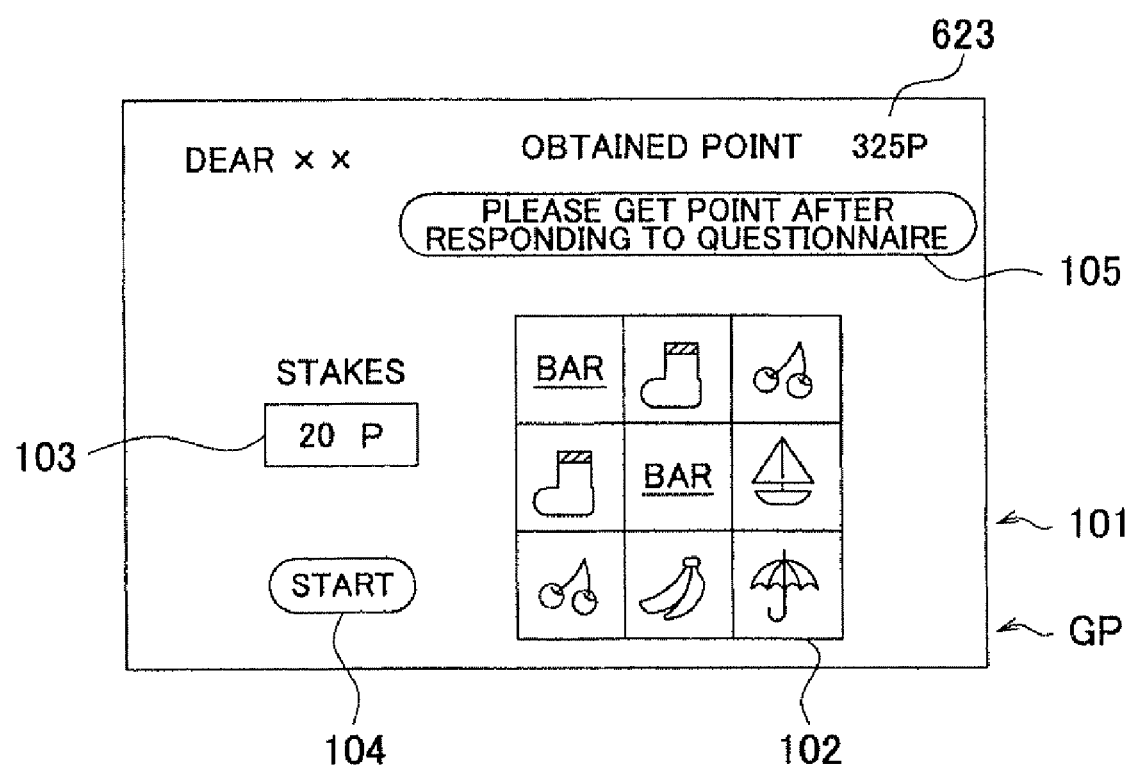
FIG. 7 is a view of an example of a game picture of a slot machine which is one of casino games.

When the user plays the casino game of the slot machine online on the server device 200 according to the user's instructions through the terminal device 100 or offline on the terminal device according to the casino game program downloaded from the server device 200, for example, a game picture GP as shown in FIG. 7 is displayed on a display 101 of the terminal device 100 used by the user according to the casino game program. On the game picture GP, the obtained point 623 to be used by the user for the casino game, that is, the slot machine in this case, reels 102 of the slot machine, money 103 staked by the user as stakes, a start button 104 for starting the slot machine, an questionnaire request button 105 are shown. The obtained point 623 is the data stored in an address corresponding to the user ID 621 of the user in the point control table 620 of the server device 200 as shown in FIG. 4(*b*) and the data is downloaded from to the table to the terminal device 100.

Whenever the user instructs to execute the casino game once through the terminal device 100, a game execution signal is outputted from the terminal device 100 to the server device 200, and if necessary, the number of the point of the stakes 103 of the user at the time of execution of the casino game is outputted as stakes data, regardless of the casino game execution state, online or offline. After receiving the game execution signal, the controller 203 of the server device 200 updates a value of the obtained point of the user by subtracting the point shown in the stakes data from the obtained point 623 of the point control table 620 of the user, and controls to always update the value of the obtained point of the user of the point control table 620 (point update means).

The stakes may be constant in each game, or may be optionally set within the bounds of the obtained point 623 which the user owns through a controller 1003 of the terminal device 100 by operating the input means, such as a keyboard. Contents of the slot machine game are not mentioned here since such a game is well known.

The user clicks (or operates) the questionnaire request button 105 on the game picture GP through the operation of the input means if the value of the obtained point 623 of the user becomes lower than the stakes of one time casino game, or such a state is anticipated during playing the casino game, that is, the user wishes to increase the present obtained point 623 in order to further continue the casino game.

Then, the controller 1003 of the terminal device 100 sends the questionnaire request signal to the server device 200 of the apparatus of playing casino game 1. The server device 200 receives such a signal through the communication interface 215 (means for receiving response request), and the controller 203 of the server device 200 judges the obtained point of the user to be a predetermined value or lower (search means).

When the questionnaire request signal is inputted, the server device 200 executes questionnaire answer program AAP as shown in FIG. 8, and acknowledges that the questionnaire answer request has been issued from some terminal device 100 in Step S1. If the judgment is that the questionnaire answer request button 105 has been operated in the terminal device 100, the program enters Step S2, and the server device 200 immediately refers to the user table 610 and the point control table 620 on the basis of the user ID of the terminal device 100 through which the signal was outputted, and refers to the affiliate advertisement data file of the affiliate advertisements regarding many advertisers which are stored in the HDD 207 of the server device 200 in advance so as to search the affiliate advertisement which the user can select, that is, to which the user can answer (search means).

The affiliate advertisement data file stores the personal information data requested by all affiliate advertisements in the portal site every affiliate advertisement. The controller 203 of the server device 200 checks the personal information data 612 to 619 shown in the user table 610 of the user of the terminal device 100 through which the questionnaire search request signal has been outputted and the personal information data requested by each affiliate advertisement of the affiliate advertisement data file, and selects one or more affiliate advertisements to which the user can answer. In other words, when the contents of the personal information data 612 to 619 of the user and the contents of the personal information data requested by the affiliate advertisement are corresponded with each other, the corresponding affiliate advertisement is selected and extracted.

Suppose the personal information of some user stored in the user table 610 is as follows.

A. User ID: 12345678
B. PW (Password): *****
C. Full name: Erika O'Sullivan
D. Sex: Female
E. Date of birth: Jul. 1, 1985
F. Address 1280 Maple street, Oklahoma, U.S.A.
G. Telephone number: 0123-456-7890
H. E-mail address: erika@mpy.ne.au
I. Others, such as hobby: Skiing, swimming, tennis, reading, cooking and journey Besides, suppose the followings are stored in the affiliate advertisement data file as the personal information data requested by some affiliate advertisement.

J. Age: 20 to 30
K. Sex: Female
L. Others, such as hobby: Skiing

In other words, an object of the affiliate advertisement is to collect the personal information of a female whose age is twenty to thirty and whose hobby is skiing.

The controller 203 of the server device 200 judges whether or not the item of the personal information data requested by each affiliate advertisement matches the personal information data of the user, and extracts all affiliate advertisements which match the personal information data of the user as questionnaires which the user can utilize, and sends these to the terminal device 100 of the user. In the above-mentioned case, the items J, K and L of the personal information data requested by the affiliate advertisement are judged to match the items E, D and I of the personal information data of the user, and such an affiliate advertisement is extracted from the affiliate advertisement data file as the questionnaire which the user can utilize (search means).

When one or more questionnaires (affiliate advertisements) which the user can utilize are extracted, the controller 203 of the server device 200 produces a table picture which is edited so as to select the questionnaire by the user, that is, which is edited so as to invite the user to select, as an affiliate advertisement selection picture, and the produced table picture is sent to the terminal device 100 corresponding to the user through a public communication line (means for producing and sending advertisement selection picture), and is displayed on the display means (Step S3). The user selects the affiliate advertisement to which the user intends to respond to the questionnaire out of the affiliate advertisements displayed on the display means of the terminal device 100 through the operation of the input means.

When the user selects one or more affiliate advertisements to which questionnaires the user intends to respond, referring to the affiliate advertisement selection picture displayed on the display means of the terminal device 100, a selection result is outputted as a selection signal from the terminal device 100 to the server device 200. When the server device 200 of the apparatus of playing casino game 1 receives the selection signal (selection signal receiving means) and the input of the selection result is confirmed (Step S4), the controller 203 of the server device 200 instructs the personal information interface 420 to collectively answer to the questionnaires of all selected affiliate advertisements (collective transmission instructing means), and the personal information interface 420 collectively answer to the questionnaires in such a manner that the necessary personal information data are read out of the user table 610 of the user and the personal information request forms 630 of the selected all affiliate advertisements are filled by the read necessary data in a way which was mentioned in connection with FIG. 5. And, the filled forms are outputted to the advertisement servers 300 of the affiliate advertisements in the way above-mentioned (Step S5).

The controller 203 of the server device 200 enters Step 6 of the questionnaire answer program AAP, and judges whether or not the server device 200 receives a point as the compensation from each advertiser server 300 through the ASP 410. If the receipt is confirmed, the program proceeds to Step S7, and a value of the obtained point which is stored in its address of the point control table 620 of the user is accumulated and updated. When the value of the obtained point of the corresponding user is updated, the server device 200 immediately sends the value of the updated obtained point to the corresponding terminal device 100, and the terminal device 100 which received such a value updates a representation of the obtained point 623 on the game picture GP on which the user is playing a game so as to be the value to which the point obtained by responding to the questionnaire of the affiliate advertisement was added. That is, the obtained point was increased. In such a way, the obtained point which was not or may not be sufficient for stakes of one time casino game is increased, and it is possible for the user to continue the casino game.

In order to obtain for the user the obtained point 623 for continuation of the casino game, the user only clicks (or operates) the questionnaire request button 105 on the game picture GP and only selects the affiliate advertisement to which questionnaire the user is not reluctant to answer on the questionnaire selection picture which is sent from the server device 200 through an operation of the input means. Therefore, it is not necessary for the user to input the personal information data requested by each affiliate advertisement, which needs a rather longer time, that is, it is not necessary for the user to answer to the questionnaire since the apparatus of playing casino game 1 prepares the questionnaire after the selection of the affiliate advertisement by the user. Then, the user is immediately enable to obtain the point as the rewards of the questionnaire answer from each advertiser, and is possible to rapidly continue the casino game. In addition, the user is possible to effectively play the casino game since it is not necessary for the user to conduct a work, such as the answer of the questionnaire, which has no relation with the casino game.

The above-mentioned embodiment refers to such a case where the user clicks (or operates) the questionnaire request button 105 on the game picture GP through the operation of the input means so as to output the questionnaire response request signal to the affiliate advertisement if the user does not have or may not have sufficient stakes for one time casino game with the present obtained point AP but wishes to increase the present obtained point AP in order to continue the casino game.

But, in the invention, the server device 200 may automatically produce the questionnaire request signal (means for producing response request) by programmably judging such a state where the user does not have or may not have sufficient stakes for one time casino game with the present obtained point AP, that is, the obtained point 623 of the point control table 620 in the server device 200 in the apparatus of playing casino game 1 or the obtained point which is stored in and controlled by the terminal device 100 of the user (the obtained point is updated and controlled at a predetermined interval by the apparatus of playing casino game 1, synchronizing with the value of the obtained point of the point control table 620 as an original value) becomes lower than a predetermined value. Alternatively, the controller 1003 of the terminal device 100 may automatically produce and output the questionnaire request signal with no operation of the input means by the user, and the controller 203 of the server device 200 receiving such a signal may judge the value of the obtained point 623 of the user to be lower than a predetermined point (search means).

As already mentioned, the casino game is executed in such a way that a program for executing the casino game is read out of the HDD 207 of the server device 200 so as to download such program into the terminal device 100 and the terminal device 100 executes the casino game on the basis of the downloaded casino game program. In addition, the terminal device 100 may instruct the controller 203 of the server device to execute the casino game program through a public communication line, such as the Internet, and the casino game may be executed by the terminal device on the server device 200.

The casino game may have the following structure. If the stakes 103 of the casino game in the terminal device 100 is a constant amount of money, the point received by responding to the questionnaire of the affiliate advertisement is accumulated. If the casino game program judges that the stakes 103 necessary for continuation of the casino game is more than the stakes of the casino game and the user can further continue the casino game, the point corresponding to the stakes 103 of the casino game is automatically subtracted from the point control table 620 so as to cover the stakes 103 of the casino game. In such a case, the server device 200 sends such a notification that the point corresponding to predetermined stakes is to be subtracted from the point control table 620 of the user and a signal through which one time casino game is allowed to be executed to the corresponding terminal device if the casino game is executed by the casino game program downloaded at each terminal device 100. After receiving such notification and signal, the controller 1003 of each terminal device 100 controls to newly start one time of the casino game, putting the stakes 103 corresponding to the subtracted point according to the casino game program, as shown in FIG. 7. If each user executes the casino game on the server device 200, the controller 203 of the server device 200 executes similar procedures according to the casino game program.

The invention can be transformed into and applied to various kinds of forms in addition to the above-mentioned embodiments. Some variations of the invention are now mentioned.

In the above-mentioned embodiment, the personal information registered at the time of the membership registration is sent to the advertiser server 300 and a point is returned after a user who registered a membership in the portal site logs in the member site and clicks the affiliate advertisements 521, 522 attached to the member site. In other words, a troublesome procedure, an input of the user ID and the password, is necessary for an access to the membership site. On the contrary, in this embodiment an access through the terminal device 100 by the user who has already registered the membership may be judged by the IP address of the terminal device 100 without differentiating the member site and the non-member site from each other (that is, without logging in the member site).

In the above-mentioned embodiment, the invention is applied in such a system that the affiliate advertisements 521, 522 are utilized through the portal site provided by one server device 200. In addition to such an embodiment, the invention can be applied in such a case that the registered user utilizes the affiliate advertisement attached to the different affiliate advertisements provided by two or more server devices.

For example, a server device A for providing a site A, a server device B for providing a site B and a server device C for controlling the personal information of the user with a table (which is similar to the user table 610) are substituted for the server device 200 in the above-mentioned embodiment, and the terminal device 100 of each user can access both server devices A, B. Each user of the terminal device 100 registers the user ID which is controlled in the server device C as the user ID (common ID) for common use in such an affiliate advertisement system when registering the membership in the sites A and B.

The personal information of the user to be controlled by the server device C may be inputted in the site A or B which the user firstly utilizes and may be sent to the server device C therefrom so as to collectively control. Alternatively, the personal information of the users is not collectively controlled by one server device, but the site wherein the personal information of the user has been registered may be specified by the common ID and the server device which provides the site in which the affiliate advertisement is clicked may send such information that the affiliate advertisement was clicked to the server device shown by the common ID.

If the user who clicked the affiliate advertisement attached to the site A is one who registered the common ID, the server device A sends the common ID registered in the site A to the server device C together with the affiliate ID of the clicked affiliate advertisement. And, the server device C reads the personal information of the user from the table which controls the personal information on the basis of the common ID which has been sent from the server device A, and the personal information is sent to the advertiser server 300 on the basis of the affiliate ID. Such a procedure is similar in the case of the server device B.

In the above-mentioned embodiment, the program and data of the server device 200 are stored in the storage medium 231 and are distributed. On the contrary, such program and data may be stored in a fixed disk device owned by the other server device which exist on a network and may be distributed to the device body 201 through the network. In the server device 200, the program and data received by the communication interface 215 from the other server device can be stored in the HDD 207 and can be loaded in the RAM 205 at the time of execution.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. Apparatus of playing casino game which connects with two or more terminal devices for respective users and two or more advertiser servers that provide affiliate advertisements through a public communication line, comprising:

personal information storing means for storing personal information of said user;

personal information interface means in which said personal information of said users requested by said advertiser of said affiliate advertisement are stored;

means for presenting affiliate advertisement of said advertiser server to a user who operates said terminal device on said apparatus of playing casino game;

point control means for sending personal information of said user to said advertiser server of said affiliate advertisement which is presented by said apparatus of playing casino game, which is selected by said user through an operation of said terminal device, and for giving a point received from said advertiser server as compensation to said user who selected said affiliate advertisement and storing an point obtained by accumulating given points in a predetermined memory as an obtained point for each user;

casino game execution means for getting said user to play a casino game in such a way that casino game program is executed on said apparatus of playing casino game according to an instruction of said user through said terminal device or said casino game program downloaded into said terminal device is executed by said terminal device with at least a part of said obtained point as stakes;

point update means for subtracting a value of a stake of said user that was consumed at the time of execution of said casino game from a value of obtained point corresponding thereto in said memory;

means for receiving a questionnaire response request signal that receives questionnaire response request signals from said terminal of said user or means for automatic generation of a questionnaire response request signal that automatically generates signals for requesting a response to said questionnaire if a value of the obtained point of said user in said memory is a predetermined value or lower;

search means through which if said questionnaire response request signal is received by said means for receiving said questionnaire response request signal or is generated by said means for automatic generation of said questionnaire response request signal, said personal information of said user stored in said personal information storing means for whom said questionnaire response request signal was received or generated and said personal information of said user requested by said advertiser of said affiliate advertisement that is stored in said personal information interface means are checked and said affiliate advertisement fit for both is searched as an affiliate advertisement to which said user can respond; and collective transmission instructing means, for instructing said point control means to collectively transmit said personal information of said user to said advertiser servers of said affiliate advertisements for all extracted affiliate advertisements.

2. The apparatus of playing casino game according to claim 1, said search means further having:

means for producing an affiliate advertisement selection picture so as be selectable by said user from searched and extracted affiliate advertisements after searching and extracting said affiliate advertisements to which said user can respond and sending said picture to said terminal device of said user; and selection signal receiving means for receiving a selection signal which shows selection result of said affiliate advertisement according to said affiliate advertisement selection picture, which is sent from said terminal device of said user to said apparatus of playing casino game;

whereby said collective transmission instructing means deals with said affiliate advertisement selected by said selection signal as said all extracted affiliate advertisements.

* * * * *